United States Patent [19]

Larribe

[11] 4,350,485

[45] Sep. 21, 1982

[54] DEVICE FOR MOULDING CYLINDRICAL PIECES

[75] Inventor: Andre Larribe, Le Pecq, France

[73] Assignee: Societe Nationale Industrielle Aerospatiale, Paris, France

[21] Appl. No.: 297,755

[22] Filed: Aug. 31, 1981

Related U.S. Application Data

[63] Continuation of Ser. No. 147,499, May 7, 1980, abandoned.

[30] Foreign Application Priority Data

May 25, 1979 [FR] France .................................. 79 13314

[51] Int. Cl.³ ............................................ B29C 17/00
[52] U.S. Cl. .................................... 425/389; 425/392; 425/403; 249/173; 249/175; 72/367
[58] Field of Search ...................... 425/389, 392, 403; 249/65, 173, 175

[56] References Cited

U.S. PATENT DOCUMENTS

| | | | |
|---|---|---|---|
| 2,404,966 | 7/1946 | Kingston | 249/173 X |
| 2,869,213 | 1/1959 | Longfellow | 249/173 |
| 3,110,074 | 11/1963 | Menzel et al. | 249/173 X |
| 3,158,907 | 12/1964 | Pavicevic | 249/65 X |
| 3,257,690 | 6/1966 | Scott | 249/65 X |
| 3,377,657 | 4/1968 | Richardson et al. | 249/65 X |
| 3,454,257 | 7/1969 | Dupuis | 249/173 X |
| 3,679,167 | 7/1972 | Jupiter et al. | 249/173 |
| 3,989,221 | 11/1976 | Okada et al. | 249/173 |
| 4,084,782 | 4/1978 | Okada | 249/173 X |

FOREIGN PATENT DOCUMENTS 1127465  8/1966  France .............................. 249/175

Primary Examiner—J. Howard Flint, Jr.
Attorney, Agent, or Firm—Merriam, Marshall & Bicknell

[57] ABSTRACT

The present invention relates to a device for moulding cylindrical pieces, comprising, on the one hand, a tube made of a rigid, elastic material, split longitudinally and tending to expand transversely under the action of its inherent elasticity and, on the other hand, holding members capable, when they cooperate with said tube, of obliging the internal cavity thereof to take a reduced section corresponding to that of said pieces to be moulded and, when they do not cooperate with said tube, of allowing said internal cavity to take an expanded section. The invention is more particularly applicable to the moulding of tubular pieces, particularly from a laminate of supple fabric impregnated with polymerizable resin.

3 Claims, 4 Drawing Figures

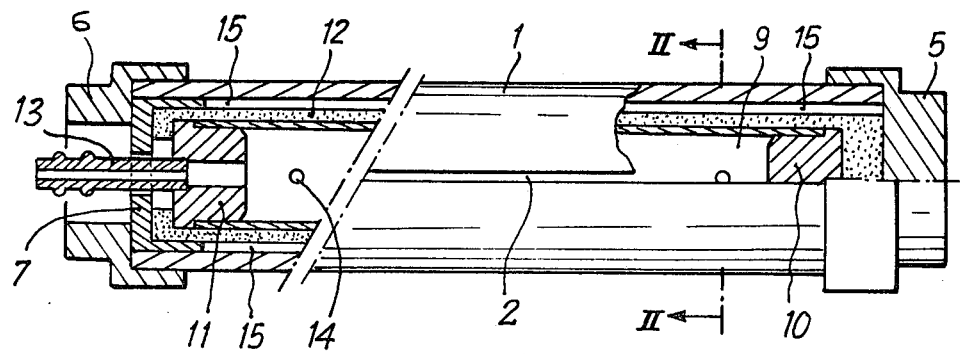
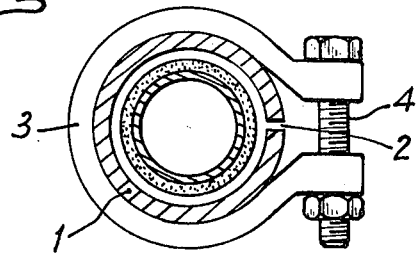
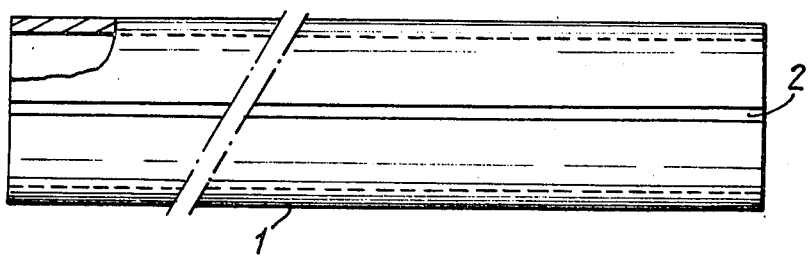
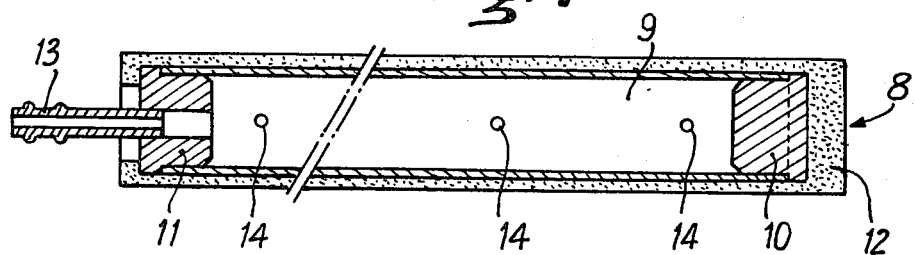

DEVICE FOR MOULDING CYLINDRICAL PIECES

This is a continuation, of application Ser. No. 147,499, filed May 7, 1980, now abandoned.

The present invention relates to the moulding of cylindrical pieces. "Cylindrical piece" is understood to mean, hereinafter, any piece whose outer surface is formed by parallel generatrices, whatever the shape of its cross-section which, of course, may be circular, but may also be oval, polygonal, etc.

Difficulties are known to arise when moulding cylindrical pieces, since their shape renders it virtually impossible to demould them. To make such pieces, one-piece moulds cannot used and it is necessary to provide moulds in at least two parts which may be assembled together along a plane of join passing through the axis of said pieces. Apart from the fact that such moulds are expensive, de-moulding generally involves tearing one of the parts of the mould with respect to the other, which is detrimental to the life of the mating surfaces and of the members for the relative positioning of said parts.

If, to avoid these drawbacks, it is desired to make use of one-piece moulds which are less expensive and longer lasting than moulds composed of a plurality of parts, it is necessary to give said pieces draft, i.e. to render them slightly conical. Such a deformation is not always possible, when said pieces must be absolutely cylindrical.

It is an object of the present invention to remedy these drawbacks, by providing an inexpensive one-piece moulding device allowing perfectly cylindrical pieces to be moulded and de-moulded. Moreover, this device according to the invention gives the moulded cylindrical pieces, directly from moulding, a highly finished surface state.

To this end, according to the invention, the device for moulding cylindrical pieces is noteworthy in that it comprises, on the one hand, a tube made of a rigid, elastic material, split longitudinally and tending to expand transversely under the action of its inherent elasticity and, on the other hand, holding members adapted, when they cooperate with said tube, to oblige the inner cavity thereof to take a reduced section corresponding to that of said pieces to be moulded and, when they do not cooperate with said tube, to allow said inner cavity to take an expanded section.

Thus, during moulding, said holding members allow the tube to constitute the mould whilst, to demould a cylindrical piece which has just been moulded, it suffices to eliminate the action of said helding members, so that said tube expands and said piece may be easily removed from the tube. Everything occurs as if the one-piece mould according to the invention were constituted by two hemicylindrical shells pivoted along a generatrix diametrically opposite the longitudinal slit of the tube, in order to be able to pivot with respect to each other in limited manner, the passage from the reduced position to the expanded position taking place under the action of the inherent elasticity of the tube, whilst the passage from the expanded position to the reduced position takes place against this elastic action.

The transversely expansible tube of the device according to the invention is made of steel and its interior is treated mechanically, for example by roll-over, in order to create a stress therein capable of allowing the said tube to expand transversely when it is split. Such a mechanical treatment presents the advantage of giving the interior of the tube, which will constitute the moulding cavity, an excellent surface state and a high resistance to wear by friction. Thus, the mould obtained is robust and gives the moulded pieces a good finish.

For example, in the case of steel tubes of the quality of hydraulic jack cylinders, having a nominal inner diameter of 60 mm, a spontaneous increase of 0.5 to 1 mm of this inner diameter may be obtained by roll-over as soon as the tube is split. The width of the slit may be small, for example of the order of half a millimeter.

Under these conditions, it suffices to provide tightening means combined with the holding members or independent thereof, such as clamps or the like, allowing the passage of the tube from its expanded section to its reduced section and vice versa, for the tube to take its shape for moulding or the one for de-moulding. As the tube tightening and loosening operations are effected well within the elastic limit, they may be renewed often without deteriorating the tube.

The device according to the invention may be used for moulding solid or tubular cylindrical pieces from a material which is sparingly fluid, having no or only little tendency to escape through the longitudinal slit of the tube. In the case of moulding a tubular piece, it is necessary to provide a core inside said expansible tube, held in a determined relative position with respect thereto.

However, the device according to the invention is particularly appropriate for making tubular pieces constituted by a laminate of supple fabric impregnated with a polymerisable resin. In this case, the inner core may serve as winding mandrel and/or support for said laminate and it is advantageous if said core is itself provided to be radially expansible in order to press said laminate against the inner wall of the split tube during polymerisation of said resin.

Such a core may comprise an inflatable bag member connected outside the split tube to a source of fluid under pressure. Said inflatable bag member may be mounted on a rigid tube serving as support, the inside of said tube being in communication on the one hand with said source of pressurised fluid and, on the other hand, via through holes, with the inner face of said bag-member.

The invention will be more readily understood on reading the following description with reference to the accompanying drawings, in which:

FIG. 1 is a view, partly in longitudinal section, of a moulding device according to the invention, intended for making tubular rod bodies.

FIG. 2 is a view in transverse section along line II—II of FIG. 1.

FIG. 3 is an outside view of the split tube of the device of FIGS. 1 and 2.

FIG. 4 is a view in longitudinal section of the inner core of the device of FIG. 1.

Referring now to the drawings, the moulding device according to the invention, shown by FIGS. 1 and 2, is intended for making tubular rod bodies from fabric-polymerisable resin laminate. It comprises a steel tube 1, having undergone an internal roll-over and comprising a longitudinal slit 2. Due to the internal roll-over, the tube 1 is subjected to a mechanical stress tending to cause it to expand elastically, in limited manner.

The radial expansion of the tube 1 is controlled by at least one elastic clamp 3, surrounding said tube and provided with an adjusting screw 4 (cf. FIG. 2).

Due to the clamp 3, it is possible to take the tube 1 to its nominal diameter and then to close it by two end pieces 5 and 6, connected to said tube by the force of expansion thereof.

An expansible coaxial core 8 may be held, by a spacer 7, inside the tube 1.

This core 8 comprises a rigid tube 9, obturated at its ends by stoppers 10 and 11 and supporting an inflatable bag member 12. The interior of the rigid tube 9 may be connected to a source of fluid under pressure (not shown) via a connector 13, fast with the stopper 11 passing through the endpiece 6. Furthermore, the interior of the rigid tube 9 is in communication with the inner wall of the bag element 12 via through holes 14.

A tubular body composed of fabric-resin laminate is made as follows:

The supple laminate (not shown) is wound on the core 8 of FIG. 4, which is assumed to be outside the tube 1. The core 8 and the winding of laminate would thereon are then placed in the tube which is in expanded position, as the or each clamp 3 is loosened. Whilst the core and laminate are being placed in position, the spacer 7 is arranged in position and the laminate occupies the space 15 provided between the core 8 and the tube 1. The or each clamp 3 is then tightened until the tube 1 is taken to its nominal reduced position. It may then be closed by the end pieces 5 and 6 which are maintained connected since the clamps 3 are loosened a little so that the radial pressure of expansion of the ends of the tube 1 is exerted on said end pieces.

The moulding device of FIG. 1 is introduced into an oven, for example at 120° C. for an hour and a half and the connector 13 is connected to a source of compressed air. Thus, the laminate winding is applied against the inside of the tube 1 by the bag member 12 which expands under the action of the air under pressure and the resin impregnating the laminate polymerises.

The excess resin is driven out through the slit 2 of the tube 1. After polymerisation of the resin, the device is disconnected from the source of compressed air and withdrawn from the oven.

After a period of cooling, for example 30 minutes at ambient temperature, the end pieces 5 and 6 are dismantled, as well as the clamps 3 which maintained the tube 1 at its nominal diameter. Under the action of its internal stresses, the tube 1 increases slightly in diameter and is automatically detached from the moulded pieces.

The deflated bag member 12 returns to its normal diameter and the core 8 bearing the moulded piece is withdrawn from the tube 1. The moulded piece is then extracted from the core by sliding.

The piece is then lightly pumiced in order to remove the flow of resin produced during polymerisation in the slit 2.

The absence of die outside the moulded piece at the moment of de-moulding thereof with respect to the bag member considerably facilitates the recovery of said bag member, the moulded piece undergoing no external stress.

The invention particularly enables structural rod bodies of wide body aircraft to be manufactured, with remarkable precision and finish. Moreover, the tools employed according to the invention are inexpensive and very robust and enable tubes of different thicknesses for a constant outer diameter to be obtained.

What is claimed is:

1. A mold for forming reinforced plastic tubular pieces and the like comprising:

an outer cylindrical tube formed of steel, said tube having a longitudinally extending slit formed by mechanically working the wall of an unslit tube to create therein a stress tending to cause the tube to expand transversely and then splitting the tube longitudinally, whereby said slit is formed spontaneously, said slit permitting said tube to contract diametrically on the application of an external force and to expand under the action of its inherent elasticity when said force is removed;

an inner expansible cylindrical mandrel fitted substantially concentrically within said tube, said mandrel having a diameter less than the inner diameter of said tube;

said mandrel comprising an inner rigid tube having a perforated section provided with holes for fluid flow and an inflatable bag fitted around said inner tube and enclosing said perforated section, said bag having a mouth which is hermetically sealed to said inner tube;

means for supplying fluid under pressure to said inner tube, whereby said bag can be caused to expand radially, and clamping means for applying a deforming radial force to said outer tube.

2. A mold in accordance with claim 1 further including removable end pieces adapted to receive the ends of said outer tube after the application of said radial force and to hold said outer tube in a radially deformed state.

3. A mold in accordance with claim 1 wherein said clamping means comprises at least one clamp having an adjustable diameter.

* * * * *